US012652336B2

(12) United States Patent
Honjo et al.

(10) Patent No.: US 12,652,336 B2
(45) Date of Patent: Jun. 9, 2026

(54) VEHICLE DATA COMMUNICATION SYSTEM, ELECTRONIC CONTROL UNIT, AND COMMUNICATION BAND SETTING PROGRAM

(71) Applicant: DENSO CORPORATION, Kariya-city (JP)

(72) Inventors: Kazuyoshi Honjo, Tokyo (JP); Fumihide Goto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/752,846

(22) Filed: Jun. 25, 2024

(65) Prior Publication Data

US 2025/0007982 A1     Jan. 2, 2025

(30) Foreign Application Priority Data

Jun. 27, 2023    (JP) ................................. 2023-105063

(51) Int. Cl.
| | |
|---|---|
| *H04L 67/12* | (2022.01) |
| *H04L 12/44* | (2006.01) |
| *H04L 12/46* | (2006.01) |
| *H04L 41/50* | (2022.01) |

(52) U.S. Cl.
CPC .......... *H04L 67/12* (2013.01); *H04L 41/5058* (2013.01); *H04L 12/44* (2013.01); *H04L 12/4683* (2013.01)

(58) Field of Classification Search
CPC . H04L 67/12; H04L 41/5058; H04L 12/4641; H04L 12/4683
See application file for complete search history.

(56) References Cited

U.S. PATENT DOCUMENTS

| | | | |
|---|---|---|---|
| 2003/0081595 A1 * | 5/2003 | Nomura ................ | H04L 47/825 370/353 |
| 2015/0009828 A1 * | 1/2015 | Murakami ............ | H04L 41/042 370/235 |
| 2017/0331719 A1 * | 11/2017 | Park ........................ | H04L 45/20 |

(Continued)

FOREIGN PATENT DOCUMENTS

| | | |
|---|---|---|
| JP | 2022-186222 A | 12/2022 |

OTHER PUBLICATIONS

AUTOSAR, SOME/IP Protocol Specification, AUTOSAR FO R22-11, dated Nov. 24, 2022, pp. 1-71.

*Primary Examiner* — Tonia L Dollinger
*Assistant Examiner* — Linh T. Nguyen
(74) *Attorney, Agent, or Firm* — Harness, Dickey & Pierce, P.L.C.

(57)     ABSTRACT

A vehicle data communication system includes a server-side electronic control unit and a client-side electronic control unit configured to communicate data with each other via a communication path. The server-side electronic control unit includes a server-side communication band setting unit configured to work in conjunction with server-side service discovery. The client-side electronic control unit includes a client-side communication band setting unit configured to work in conjunction with client-side service discovery. The server-side communication band setting unit and the client-side communication band setting unit are configured to dynamically set a predetermined communication band.

8 Claims, 8 Drawing Sheets

(56)         References Cited

U.S. PATENT DOCUMENTS

| | | | |
|---|---|---|---|
| 2018/0352040 A1* | 12/2018 | Bartsch | H04L 67/5651 |
| 2019/0058668 A1* | 2/2019 | Gunther | H04L 65/80 |
| 2020/0145469 A1* | 5/2020 | Kashiwazaki | H04N 7/18 |
| 2022/0173922 A1* | 6/2022 | Yoneda | H04L 12/28 |
| 2022/0201039 A1* | 6/2022 | Risso | H04L 63/0823 |
| 2023/0261961 A1* | 8/2023 | Khalil | H04L 43/0817 |
| | | | 370/474 |
| 2024/0045657 A1* | 2/2024 | Ma | G06F 9/546 |
| 2024/0086268 A1* | 3/2024 | Bivans | G06F 11/076 |

* cited by examiner

VEHICLE DATA COMMUNICATION SYSTEM, ELECTRONIC CONTROL UNIT, AND COMMUNICATION BAND SETTING PROGRAM

CROSS REFERENCE TO RELATED APPLICATION

The present application claims the benefit of priority from Japanese Patent Application No. 2023-105063 filed on Jun. 27, 2023. The entire disclosure of the above application is incorporated herein by reference.

TECHNICAL FIELD

The present disclosure relates to a vehicle data communication system, an electronic control unit, and a non-transitory computer-readable storage medium storing a communication band setting program.

BACKGROUND

In recent years, for example, there has been discussion about adopting an Ethernet (registered trademark) communication protocol for data communication within vehicles such as automobiles, and a SOME/IP (Scalable service Oriented Middleware over IP) communication protocol has been attracting attention as a communication protocol for an upper layer of the Ethernet. The SOME/IP is a specification for in-vehicle middleware that applies a service-oriented architecture to data communications in a vehicle, and is a communication protocol for service-oriented communications.

SUMMARY

A vehicle data communication system includes a server-side electronic control unit and a client-side electronic control unit configured to communicate data with each other via a communication path. The server-side electronic control unit includes a server-side communication band setting unit configured to work in conjunction with server-side service discovery. The client-side electronic control unit includes a client-side communication band setting unit configured to work in conjunction with client-side service discovery. The server-side communication band setting unit and the client-side communication band setting unit are configured to dynamically set a predetermined communication band.

BRIEF DESCRIPTION OF THE DRAWINGS

FIG. 1 is a functional block diagram showing an overall configuration of an embodiment.

FIG. 6 is a diagram showing an aspect of securing a communication band.

DETAILED DESCRIPTION

Figure 2:
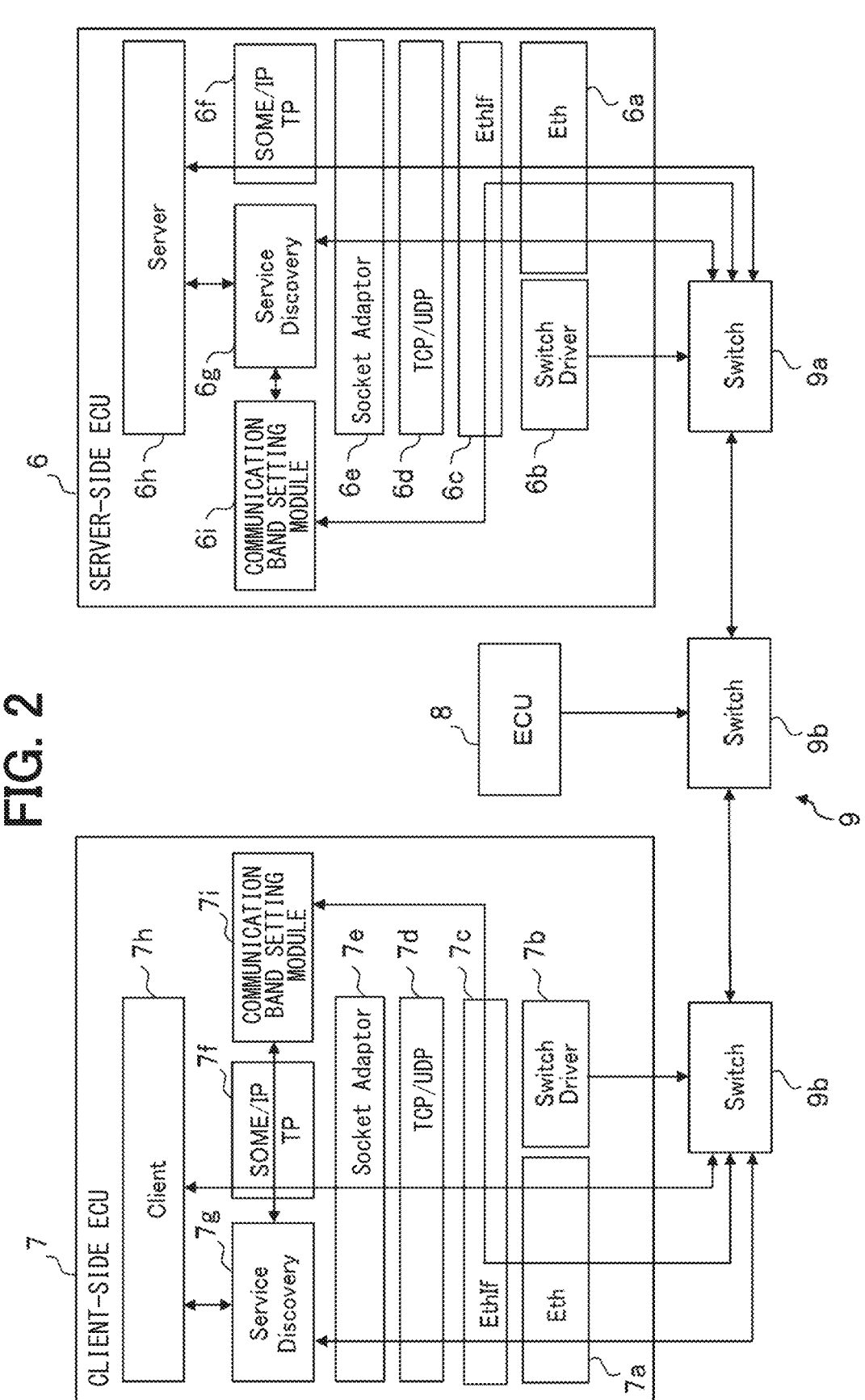
FIG. 2 is a diagram showing a software configuration.
Figure 3:
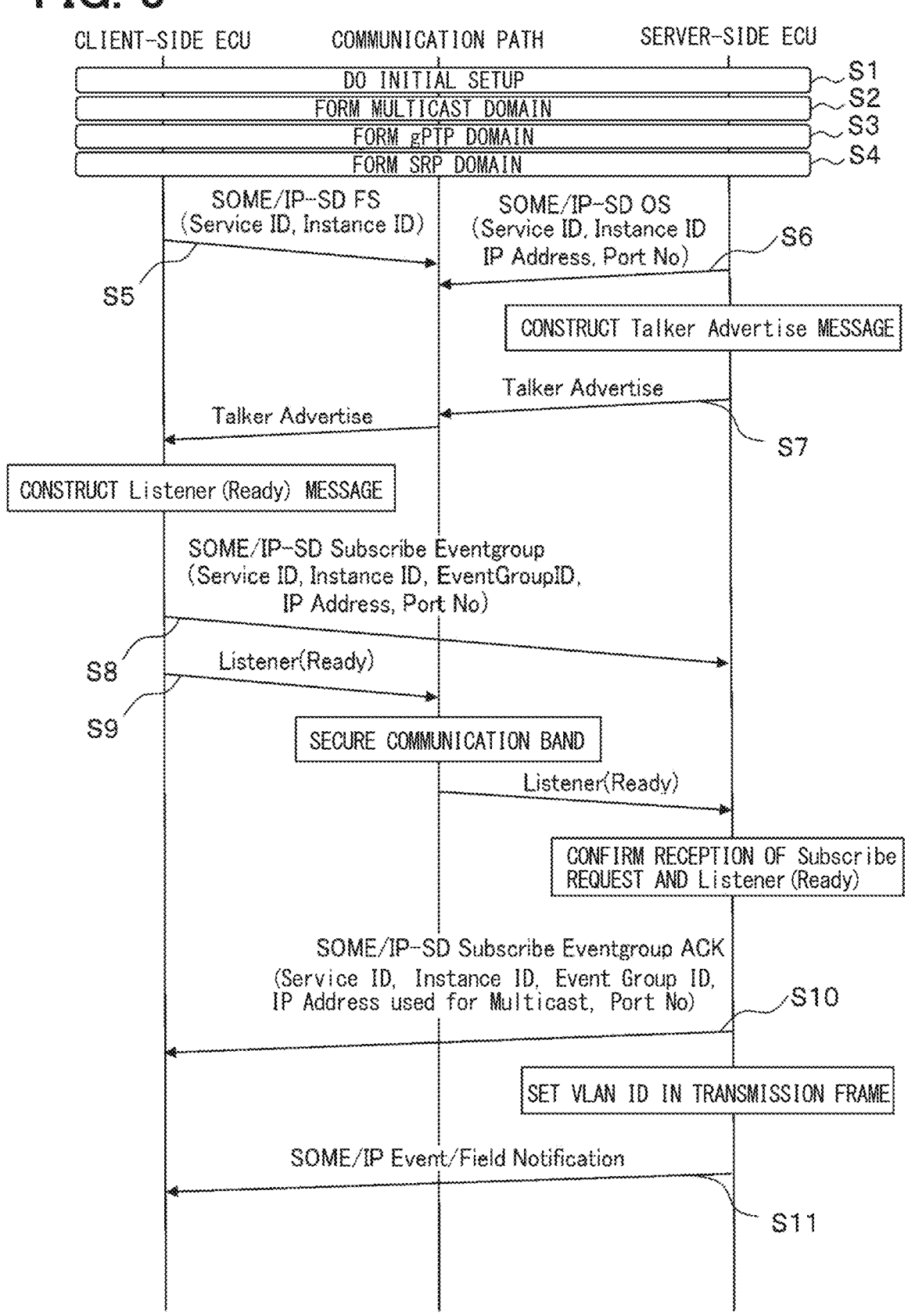
FIG. 3 is a diagram showing a flow of processes.

In SOME/IP-SD (Service Discovery), which is a communication protocol at or above a session layer, even when service communication is established, communication bandwidth required for stable data communication between a server and a client may not be necessarily secured. At a network layer and below, the communication bandwidth is generally set statically based on a system design that takes into account a communication path between the server and the client. For these reasons, in data communication using the SOME/IP communication protocol, it is necessary to appropriately secure a communication band required for stable data communication.

Examples of the present disclosure provide a vehicle data communication system, an electronic control unit, and a communication bandwidth setting program capable of appropriately securing communication bandwidth required for stable data communication when performing data communication using a communication protocol for service-oriented communication.

According to one example embodiment of the present disclosure, a vehicle data communication system includes: a server-side electronic control unit functioning as a server; and a client-side electronic control unit functioning as a client. The server-side electronic control unit and the client-side electronic control unit are configured to communicate data with each other via a communication path using a communication protocol for service-oriented communication. The server-side electronic control unit includes a server-side communication band setting unit configured to work in conjunction with server-side service discovery defined in AUTomotive Open System ARchitecture (AUTOSAR). The client-side electronic control unit includes a client-side communication band setting unit configured to work in conjunction with client-side service discovery defined in the AUTOSAR. The server-side communication band setting unit and the client-side communication band setting unit are configured to cooperate with each other to dynamically set a predetermined communication band required for data communication on the communication path.

The communication band setting unit is provided for each of the server and the client, and works with the service discovery defined in the AUTOSAR. The communication band is set by cooperation of the communication band setting unit for the server with the communication band setting unit for the client. Rather than static setting of the communication bandwidth, the dynamic setting of the communication band required for a predetermined communication band is employed. When the data communication is performed using the communication protocol for the service-oriented communication, it is possible to appropriately secure the communication band required for the stable data communication.

Figure 1:
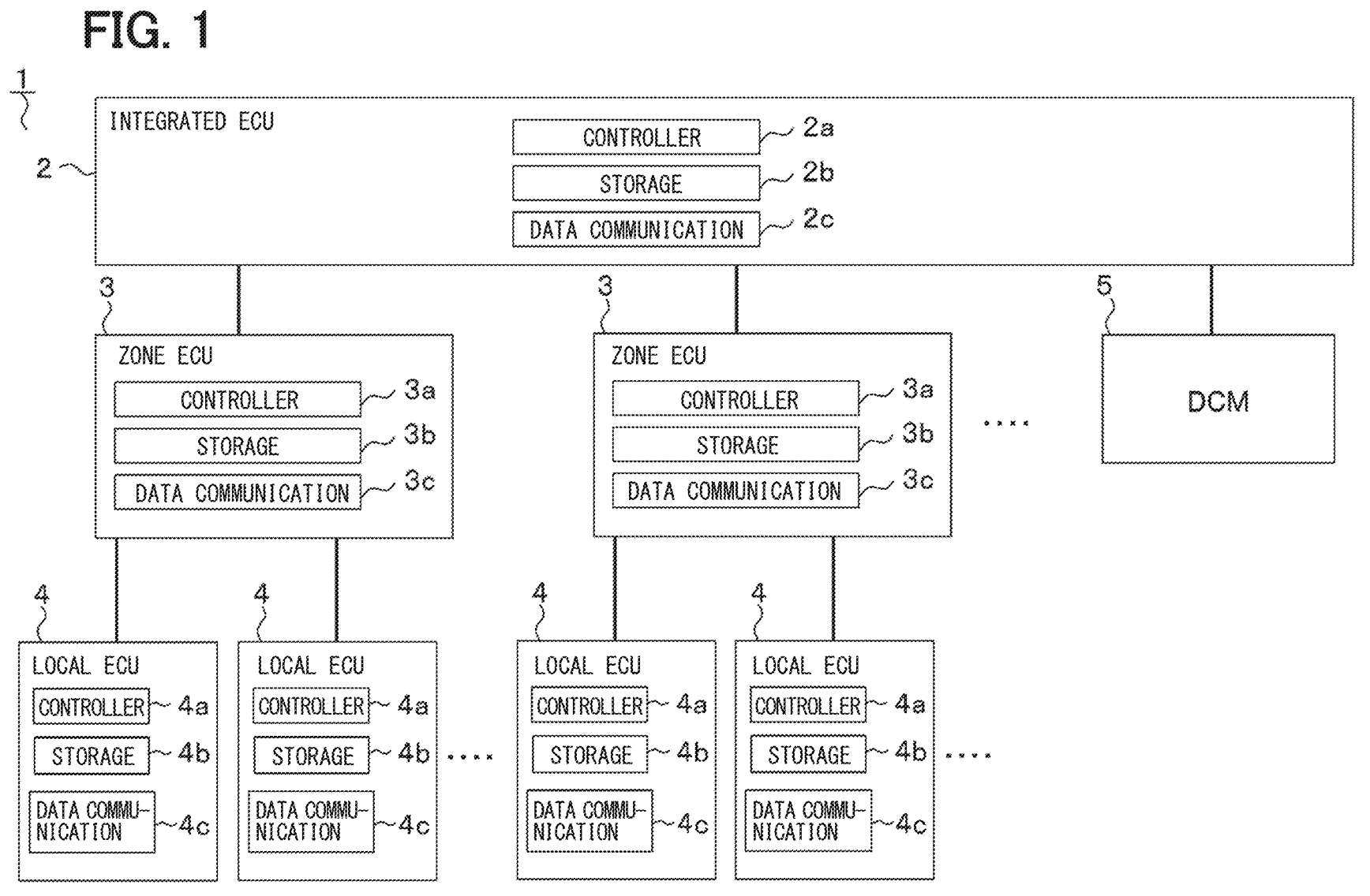

Hereinafter, an embodiment will be described with reference to the drawings. As shown in FIG. 1, a vehicle data communication system 1 is a system in which various ECUs such as an integrated ECU 2, a plurality of zone ECUs 3, and a plurality of local ECUs 4 transmit and receive frames via an in-vehicle network. The integrated ECU 2 is placed at a predetermined location of a vehicle. The zone ECUs 3 are arranged in respective areas of the vehicle, for example, in the front, rear, left and right directions, and are connected to the integrated ECU 2 via individual data communication lines. Each of the local ECUs 4 is placed at a predetermined location of the vehicle, and is connected to the nearest zone ECU 3 via the individual data communication line. The integrated ECU 2 and the plurality of zone ECUs 3 are connected in a star-type network configuration, for example, and transmit and receive frames using an Ethernet (registered trademark) communication protocol. A plurality of local ECUs 4 are arranged for one zone ECU 3, and the zone ECU 3 and the plurality of local ECUs 4 are connected in, for example, a star-type network configuration, and frames are transmitted and received according to the Ethernet communication protocol.

The integrated ECU 2 is connected to a DCM (Data Communication Module) 5 functioning as a data communication device via a data communication line. The DCM 5 transmits and receives frames to and from a server (not shown) outside the vehicle by wirelessly connecting to the server via a communication network.

The integrated ECU 2 includes a controller 2a, a storage 2b, and a data communication unit 2c. The controller 2a mainly includes an arithmetic processing device such as a CPU (Central Processing Unit) or an MPU (Micro Processing Unit). The controller 2a executes various processes by reading and executing a control program stored in the storage 2b. The controller 2a executes various processes, such as a process of transmitting and receiving frames to and from the zone ECU 3, a process of extracting and storing information from the frames, and a process of storing the stored information in the frames. The storage 2b mainly includes, for example, a non-volatile memory element such as a flash memory or an EEPROM (Electrically Erasable Programmable Read Only Memory). The data communication unit 2c controls data communication conforming to the Ethernet communication protocol, and transmits and receives frames to and from the zone ECU 3 according to the Ethernet communication protocol.

The zone ECU 3 has basically the same configuration as the integrated ECU 2, and includes a controller 3a, a storage 3b, and a data communication unit 3c. The controller 3a mainly includes an arithmetic processing unit such as a CPU or an MPU. The controller 3a executes various processes by reading and executing a control program stored in the storage 3b. The controller 3a executes, for example, various processes such as a process of transmitting and receiving frames between the integrated ECU 2 and the local ECUs 4, a process of extracting and storing information from the frames, and a process of storing the stored information in the frames. The storage 3b mainly includes, for example, a non-volatile memory element such as a flash memory or an EEPROM. The data communication unit 3c controls data communication conforming to the Ethernet communication protocol, and transmits and receives frames between the integrated ECU 2 and the local ECU 4 according to the Ethernet communication protocol.

The local ECU 4 basically has the same configuration as the integrated ECU 2 and the zone ECU 3, and includes a controller 4a, a storage 4b, and a data communication unit 4c. The controller 4a mainly includes an arithmetic processing unit such as a CPU or an MPU. The controller 4a executes various processes by reading and executing a control program stored in the storage 4b. The controller 4a executes, for example, various processes, such as a process of transmitting and receiving frames to and from the zone ECU 3, a process of extracting and storing information from the frames, and a process of storing the stored information in the frames. The storage 4b mainly includes, for example, a non-volatile memory element such as a flash memory or an EEPROM. The data communication unit 4c controls data communication conforming to the Ethernet communication protocol, and transmits and receives frames to and from the zone ECU 3 according to the Ethernet communication protocol.

Data communication is performed between the integrated ECU 2 and the zone ECU 3, and between the zone ECU 3 and the local ECU 4, using the SOME/IP communication protocol defined by AUTomotive Open System ARchitecture (AUTOSAR). For example, an image sensor is connected to the local ECU 4, image data captured by the image sensor is collected from the local ECU 4 to the integrated ECU 2. Based on an analysis result of the image data, an app executes a predetermined process. In the app, the local ECU 4 from which the image data is transmitted becomes a transmission node, the zone ECU 3 becomes a relay node, and the integrated ECU 2 to which the image data is transmitted becomes a reception node. That is, the local ECU 4 that provides the image data functions as a server-side ECU (corresponding to a server-side electronic control unit) that provides a service. The integrated ECU 2 that uses the image data functions as a client-side ECU (corresponding to a client-side electronic control unit) that uses the service.

The SOME/IP supports data communication based on a TCP/IP (Transmission Control Protocol/Internet Protocol) communication protocol. The SOME/IP implements software functions in independent service units, and constructs a system by combining the service units. The client-side ECU transmits a find service, and the server-side ECU transmits an offered service, and they attempt to establish communication between each other.

As shown in FIG. 2, an ECU 8 that relays frames is placed between a server-side ECU 6 and a client-side ECU 7. In the present embodiment, a configuration in which one ECU 8 that relays frames is provided is illustrated, but there may be two or more ECUs 8 that relay frames, or there may be no ECU 8 that relays frames.

The server-side ECU 6 has, from lower to higher layers, software layers including an Ethernet driver (Eth) 6a and a switch driver 6b as a physical layer, an Ethernet interface (EthIF) 6c as a data link layer, TCP/UDP 6d as a network layer, a socket adaptor 6e as a transport layer, SOME/IP TP 6f and service discovery 6g as a session layer, and a server application 6h as an application layer.

The client ECU 7, which functions as a client, has, from the lower layer to the upper layer, a software hierarchy including an Ethernet driver 7a and a switch driver 7b as a physical layer, an Ethernet interface 7c as a data link layer, a TCP/UDP 7d as a network layer, a socket adapter 7e as a transport layer, a SOME/IP TP 7f and a service discovery 7g as a session layer, and a client application 7h as an application layer.

A characteristic feature of the present embodiment is that a communication band setting module 6i (corresponding to a server-side communication band setting unit) is placed in the server-side ECU 6, and a communication band setting module 7i (corresponding to a client-side communication band setting unit) is placed in the client-side ECU 7. The communication bandwidth setting module 6i works in conjunction with the service discovery 6g to obtain service information provided by the service discovery 6g and timings for establishing and releasing service communication, and cooperates with the communication bandwidth setting module 7i to dynamically set the communication bandwidth required for data communication. The communication bandwidth setting module 7*i* works in conjunction with the service discovery 7*g* to obtain service information used from the service discovery 7*g* and timings for establishing and releasing service communication, and cooperates with the communication bandwidth setting module 6*i* to dynamically set the communication bandwidth required for data communication. The communication band setting module 6*i* is not limited to being disposed inside the server-side ECU 6, and may be disposed outside the server-side ECU 6. The communication band setting module 7*i* is not limited to being placed inside the client-side ECU 7, and may be placed outside the client-side ECU 7.

A communication path 9 is an Ethernet and includes switches 9*a* to 9*c* corresponding to the ECUs 6 to 8, respectively. Each of the ECUs 6 to 8 sets a communication band for each port of the corresponding switch 9*a* to 9*c*. That is, the server-side ECU 6 sets the communication band for each port of the switch 9*a*. The client-side ECU 7 sets the communication band for each port of the switch 9*b*. The ECU 8 that relays the frames sets a communication band for each port of the switch 9*c*. As a method for setting the communication bandwidth, a message session relay protocol (hereinafter referred to as MSRP) is used, and setting information for setting the communication bandwidth is propagated between switches 9*a* to 9*c* to secure the necessary communication bandwidth.

Next, operations of the above configuration will be described with reference to FIGS. 3 to 9. The client-side ECU 7 and the server-side ECU 6 cooperate with each other to sequentially perform operations (S1 to S4) including: initial setup of the entire system; multicast domain formation to form a domain for transmitting and receiving frames; gPTP (Generalized Precision Time Protocol) domain formation to establish time synchronization; and SRP domain formation.

In the client-side ECU 7, the service discovery 7*g* transmits a find service including a service ID and an instance ID to the communication path 9 (S5).

Figure 4:
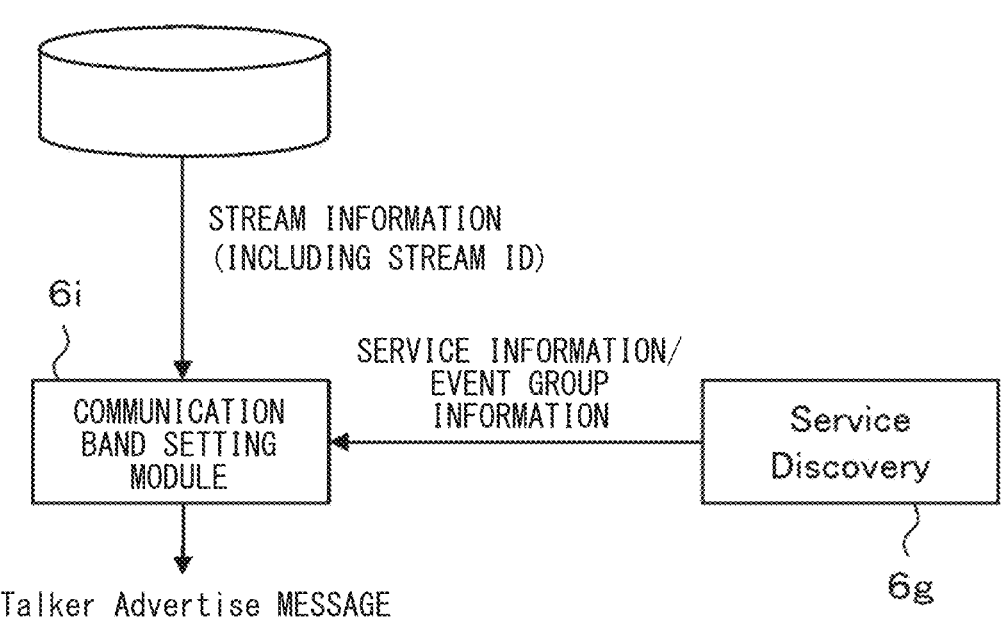
FIG. 4 is a diagram showing an aspect of constructing a first message.
Figure 6:
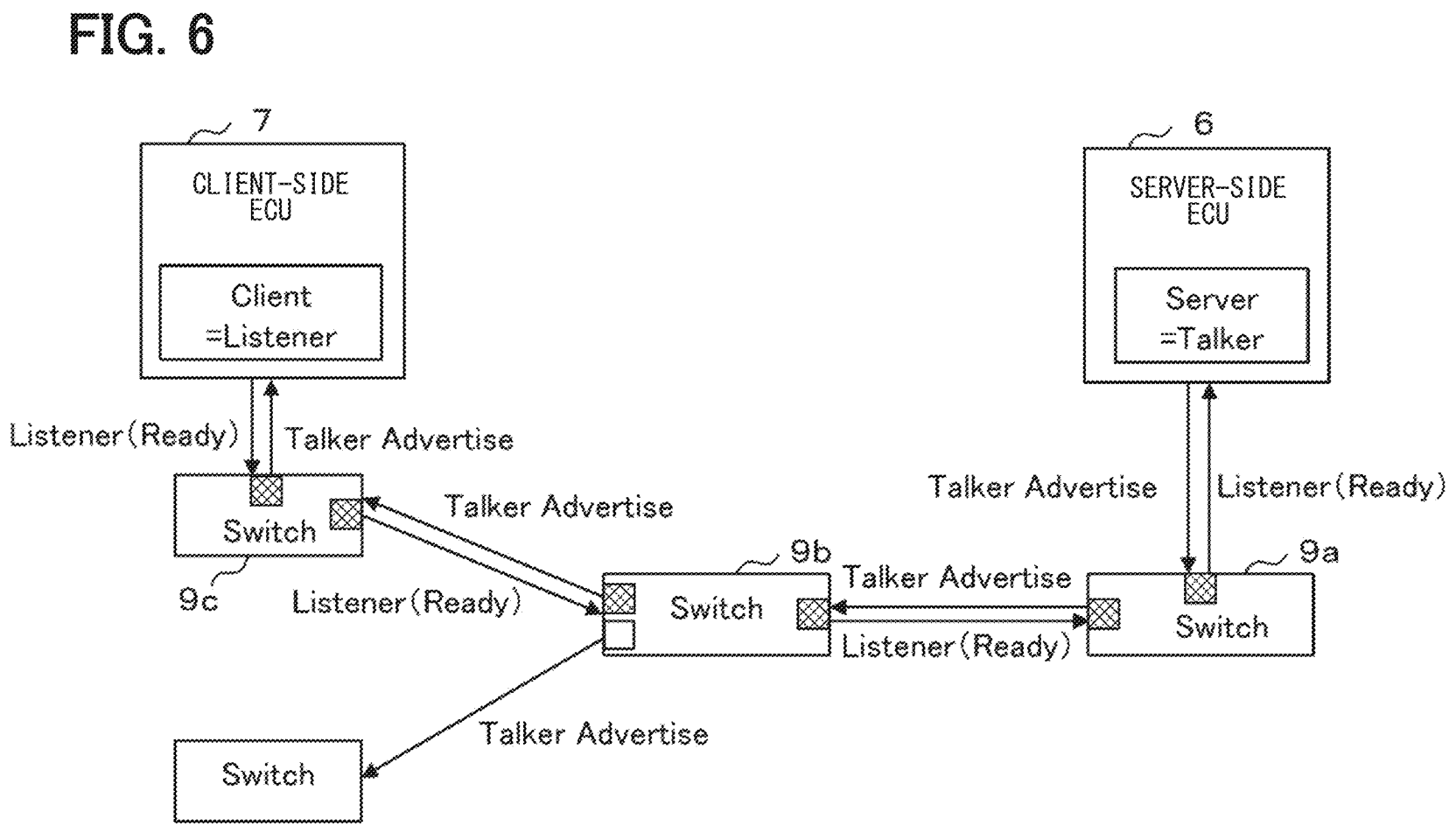

In the server-side ECU 6, the service discovery 6*g* (corresponding to a server-side service discovery) transmits an offered service including a service ID, an instance ID, an IP address, and a port number to the communication path 9 (S6, which corresponds to a server-side first transmission process). When the service discovery 6*g* transmits the offered service, the communication bandwidth setting module 6*i* obtains available service information and event group information from the service discovery 6*g*, as shown in FIG. 4, and constructs a first message (Talker Advertise) by referring to stream information including a stream ID. The communication band setting module 6*i* transmits the constructed first message to the communication path 9 (S7, which corresponds to a server-side second transmission process). As shown in FIG. 6, the first message transmitted from the server-side ECU 6 is received by the client-side ECU 7 via the switch 9*a*, the switch 9*b*, and the switch 9*c*.

Figure 5:
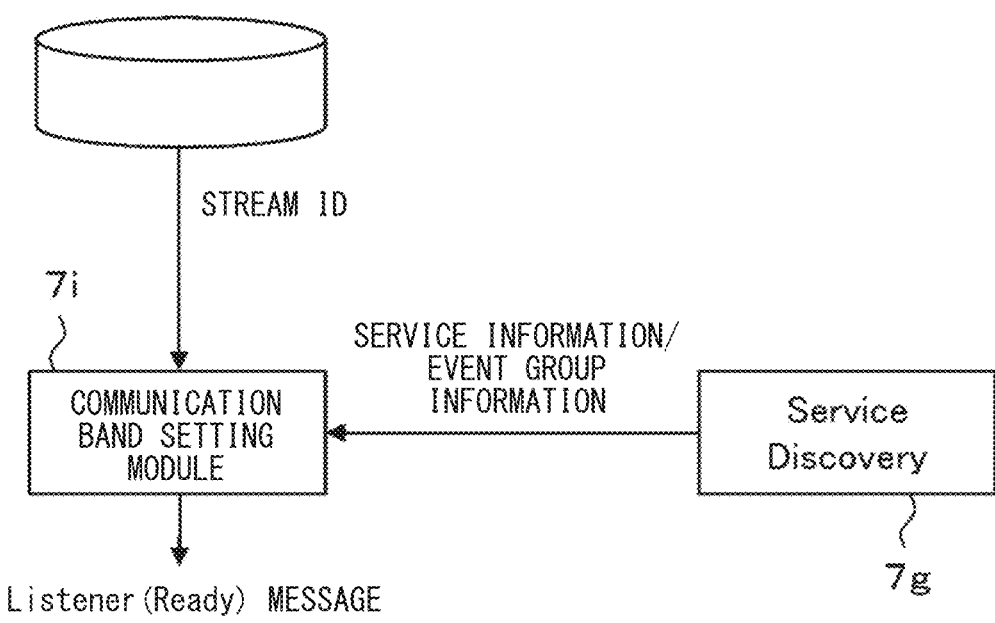
FIG. 5 is a diagram showing an aspect of constructing a second message.

In the client-side ECU 7, when the communication bandwidth setting module 7*i* receives the first message from the server-side ECU 6, as shown in FIG. 5, it obtains available service information and the event group information from the service discovery 7*g*, and constructs a second message (Listener (Ready)) by referring to the stream ID. The service discovery 7*g* transmits a subscribe request (Subscribe Eventgroup) including the service ID, instance ID, event group ID, IP address, and port number to the communication path 9 (S8, which corresponds to a client-side first transmission process). When the service discovery 7*g* transmits a subscribe request, the communication band setting module 7*i* transmits the constructed second message to the communication path 9 (S9, which corresponds to a client-side second transmission process). As shown in FIG. 6, the second message transmitted from the client-side ECU 7 is received by the server-side ECU 6 via the switch 9*c*, the switch 9*b*, and the switch 9*a*. The switches 9*a*, 9*b*, and 9*c* transfer the first message and the second message to propagate setting information for setting a communication band, and secure the necessary communication band for each port according to the stream information.

In the server-side ECU 6, when the service discovery 6*g* receives the subscribe request and the second message from the client-side ECU 7, it sends a subscribe request ACK including the service ID, the instance ID, the event group ID, the IP address to be used for multicast, and the port number to the communication path 9 (S10). The server application 6*h* sets a VLAN ID (corresponding to a VLAN identifier) according to the service information and the event group information of the transmission target to the transmission frame that is the transmission target, and transmits the transmission frame (Event/Field Notification) for which the VLAN ID is set to the communication path 9 (S11).

Figure 7:
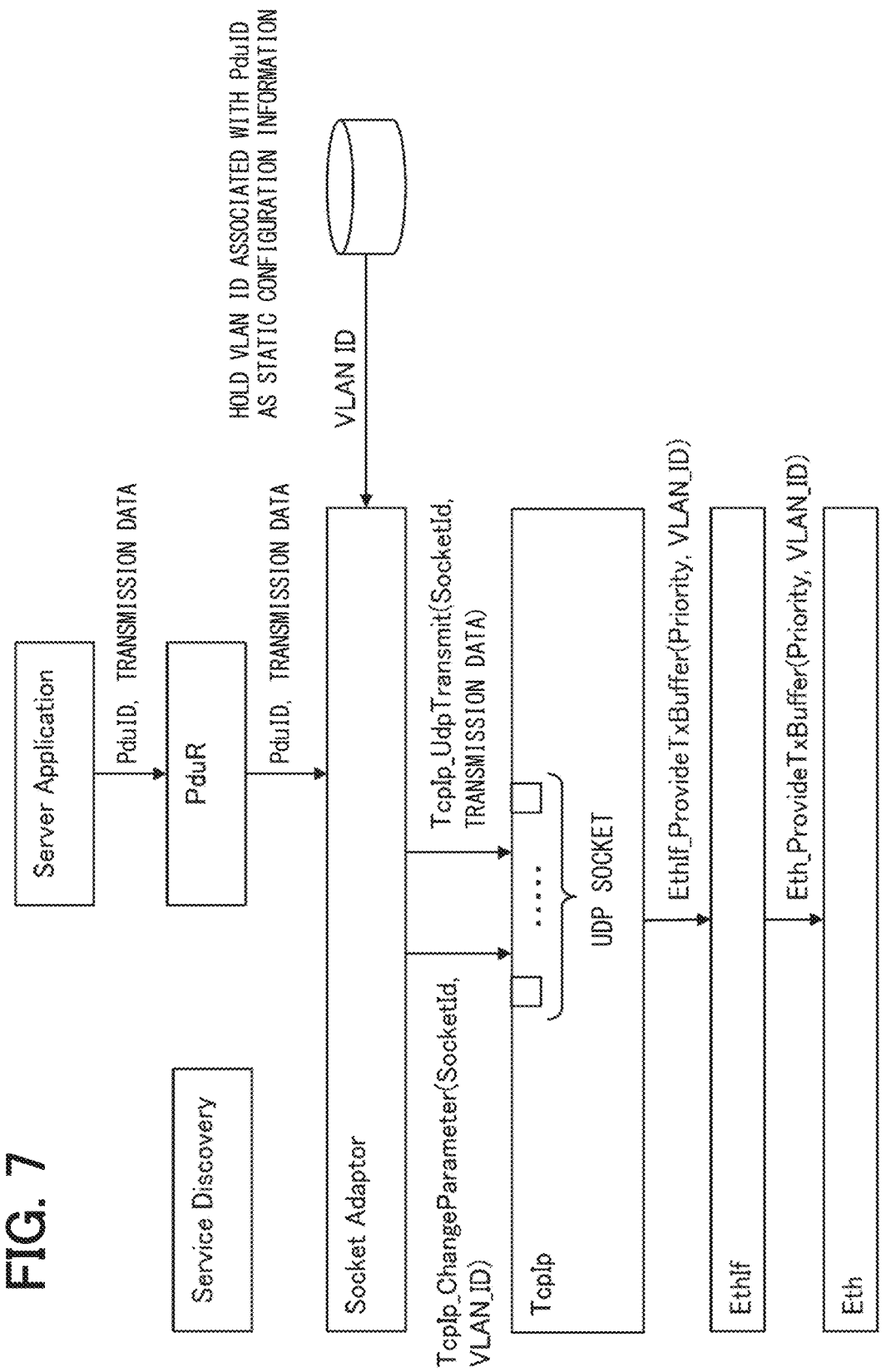
FIG. 7 is a diagram showing an aspect of setting a VLAN ID.
Figure 8:
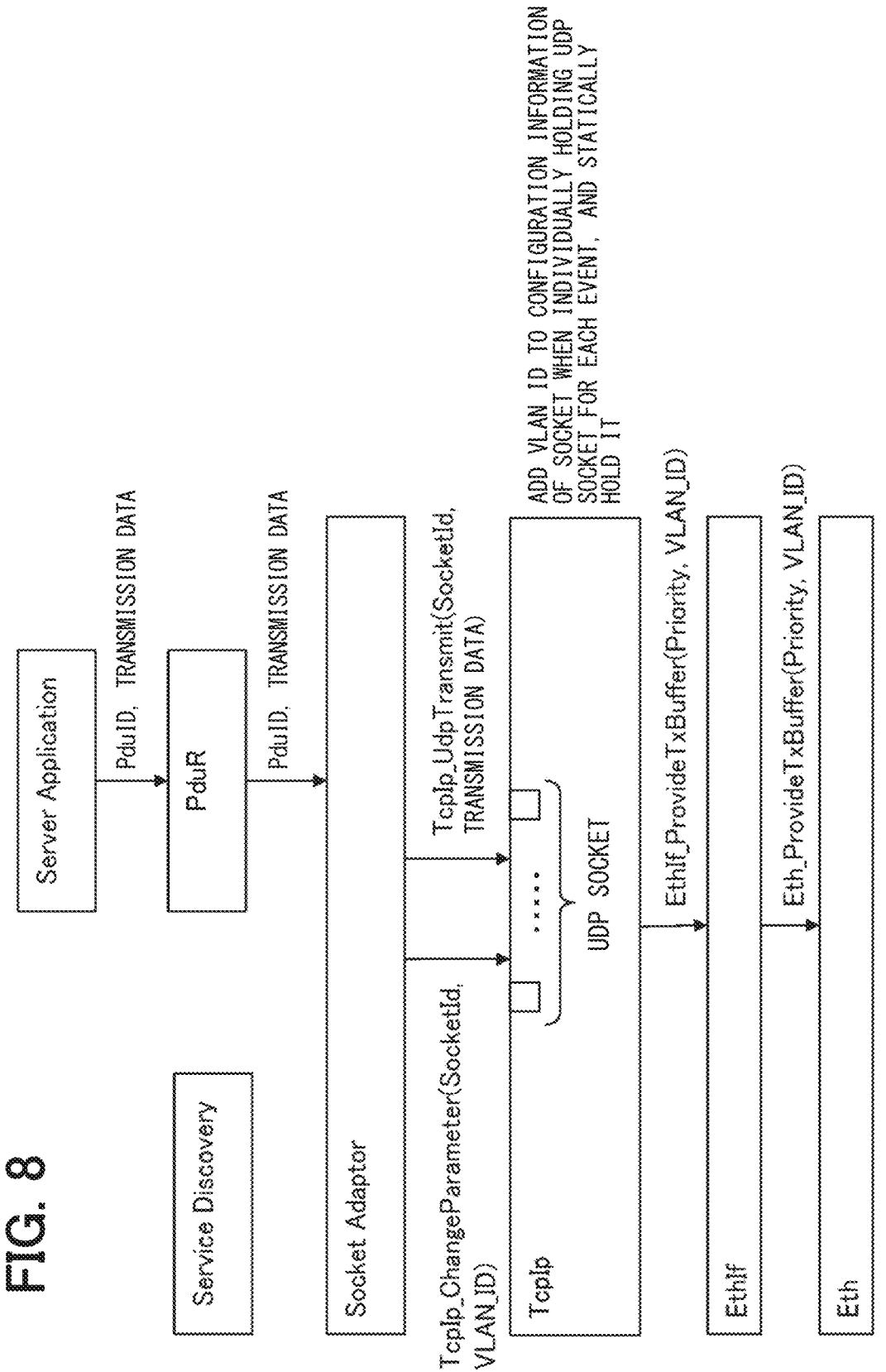
FIG. 8 is a diagram showing an aspect of setting the VLAN ID.

The server-side ECU 6 needs to associate the communication bandwidth secured by the above-described procedure with the VLAN ID, and therefore needs to set the VLAN ID in the transmission frame. In this case, there are, for example, two methods to set the VLAN ID. The first method is, as shown in FIG. 7, to store the VLAN ID associated with a Pdu ID as static configuration information and set it at the socket adapter layer. The second method, as shown in FIG. 8, is to statically store the VLAN ID by adding it to the socket configuration information when a UDP socket is individually stored for each event. By associating the secured communication bandwidth with the VLAN ID in this manner, it becomes possible to transmit frames using the secured communication bandwidth. Thereby, it becomes possible to avoid data delays, and the like.

Figure 9:
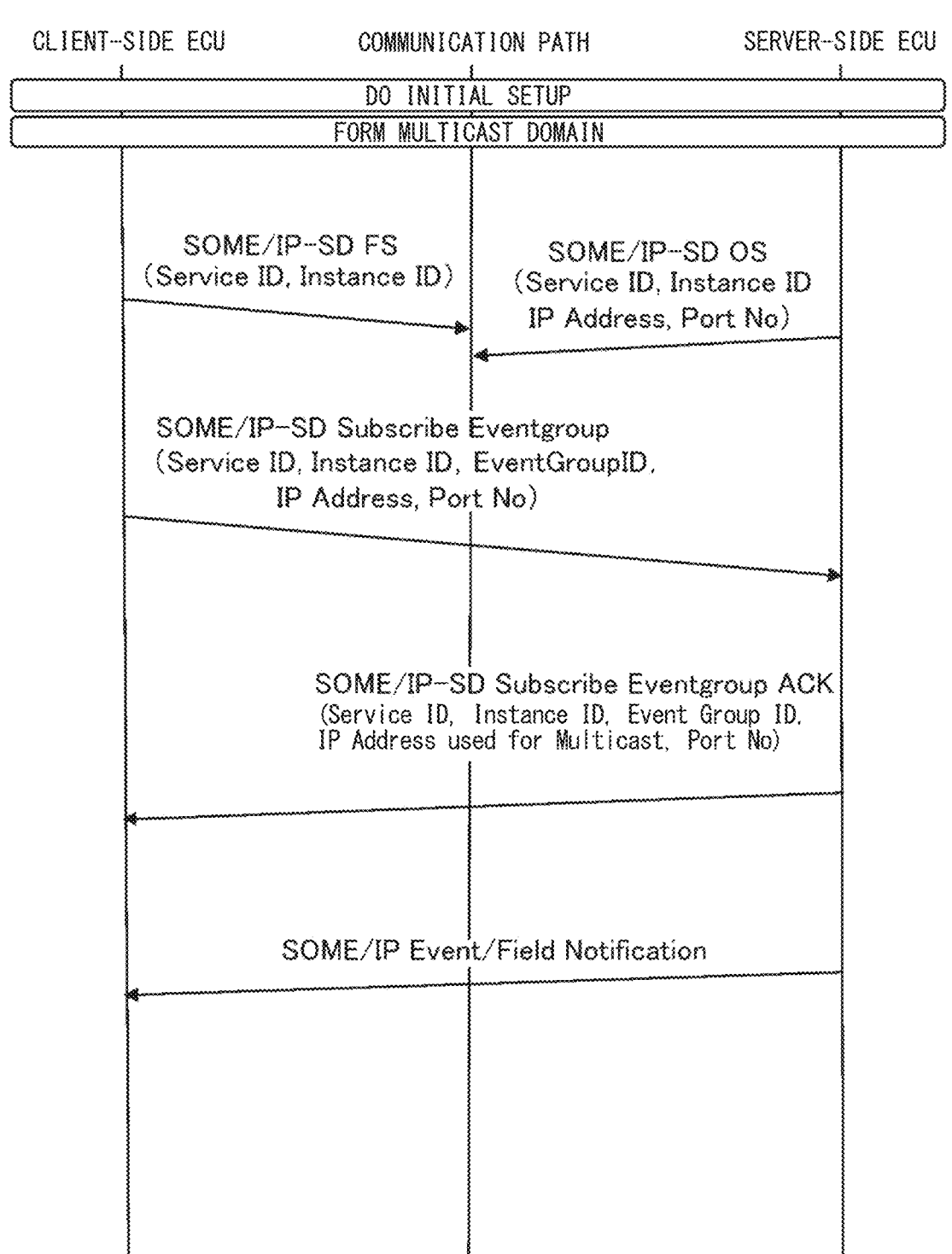
FIG. 9 is a diagram showing a process flow of a comparison target.

In a configuration in which the communication band setting modules 6*i* and 7*i* are not provided, as shown in FIG. 9, the first message (Talker Advertise) and the second message (Listener (Ready)) shown in the present embodiment are not transmitted or received. In contrast, in the present embodiment, the communication band setting modules 6*i* and 7*i* are provided, so that the first message and the second message are transmitted and received. A predetermined communication band required for data communication is dynamically set on the communication path 9.

As described above, according to the present embodiment, the following operation and effects can be obtained. In the vehicle data communication system 1, the communication band setting modules 6*i*, 7*i* that work in conjunction with the service discoveries 6*g*, 7*g* defined in AUTOSAR are provided on the server side and the client side, respectively. The communication band setting modules 6*i*, 7*i* cooperate with each other to dynamically set the predetermined communication band required for the data communication on the communication path 9. When the data communication is performed using the communication protocol for the service-oriented communication, it is possible to appropriately secure the communication band required for the stable data communication.

As a method for setting the communication band, MSRP is used, and setting information for setting the communication band is propagated between the switches 9*a* to 9*c* to ensure the necessary communication band. It is possible to secure the necessary communication bandwidth by using the existing MSRP.

The VLAN ID corresponding to the service information and event group information of the transmission target is set in the transmission frame and then transmitted. By associating the secured communication bandwidth with a VLAN ID, it becomes possible to transmit frames using the secured communication bandwidth. Thereby, it becomes possible to avoid data delays, and the like.

While the present disclosure has been described based on the above embodiments, the present disclosure is not limited to the embodiments or structures described herein. The present disclosure includes various modification examples and equivalents thereof. Various combinations and configurations, as well as other combinations and configurations including more, less, or only a single element, are within the scope and spirit of the present disclosure.

The controller and the method thereof described in the present disclosure may be implemented by a dedicated computer configured by a processor and a memory programmed to execute one or more functions embodied by a computer program. Alternatively, the controller and the method thereof described in the present disclosure may be implemented by a dedicated computer configured by a processor including one or more dedicated hardware logic circuits. Alternatively, the controller and the method thereof described in the present disclosure may be implemented by one or more dedicated computers configured by a combination of (i) a processor and a memory programmed to execute one or more functions and (ii) a processor including one or more hardware logic circuits. The computer program may be stored in a computer-readable non-transitory tangible storage medium as an instruction to be executed by the computer.

What is claimed is:

1. A vehicle data communication system comprising:
a server-side electronic control unit having a first processor configured as a server; and
a client-side electronic control unit having a second processor configured as a client,
wherein:
the server-side electronic control unit and the client-side electronic control unit are configured to communicate data with each other via a communication path using a communication protocol for service-oriented communication,
the server-side electronic control unit includes a server-side communication band setting unit configured to work in conjunction with server-side service discovery defined in AUTomotive Open System ARchitecture (AUTOSAR),
the client-side electronic control unit includes a client-side communication band setting unit configured to work in conjunction with client-side service discovery defined in the AUTOSAR,
the server-side communication band setting unit and the client-side communication band setting unit are configured to cooperate with each other to dynamically set a predetermined communication band required for data communication on the communication path,
the server-side electronic control unit statically holds stream information including a stream identification, and
the server-side communication band setting unit is configured to acquire available service information and available event group information from the server-side service discovery in response to transmission of an offered service to the client-side electronic control unit, and to construct and transmit a first message by referring to the stream information.

2. The vehicle data communication system according to claim 1, wherein
the server-side communication band setting unit and the client-side communication band setting unit are configured to dynamically set the predetermined communication band required for the data communication on the communication path using a message session relay protocol.

3. The vehicle data communication system according to claim 1, wherein
the client-side electronic control unit is configured to statically hold a stream identification (ID), and
the client-side communication band setting unit is configured to acquire available service information and available event group information from the server-side service discovery in response to transmission of a subscribe request to the server-side electronic control unit, and construct and transmit a second message by referring to the stream ID.

4. The vehicle data communication system according to claim 3, wherein
the server-side communication band setting unit is configured to
set a virtual local area network (VLAN) identifier corresponding to the service information and the event group information of a transmission target in a transmission frame, and
transmit the transmission frame.

5. An electronic control unit having a first processor configured as a server of a vehicle data communication system and to communicate data with a client-side electronic control unit having a second processor configured as a client via a communication path using a communication protocol for service-oriented communication, the first processor of the electronic control unit configured to implement:
a server-side communication band setting unit configured to work in conjunction with a service discovery defined in AUTOSAR, and cooperate with a client-side communication band setting unit of the client-side electronic control unit to dynamically set a predetermined communication band required for the data communication on the communication path;
wherein:
the electronic control unit statically holds stream information including a stream identification, and
the server-side communication band setting unit is configured to acquire available service information and available event group information from the service discovery in response to transmission of an offered service to the client-side electronic control unit, and to construct and transmit a first message by referring to the stream information.

6. An electronic control unit having a first processor configured as a client of a vehicle data communication system and to communicate data with a server-side electronic control unit having a second processor configured as a server via a communication path using a communication protocol for service-oriented communication, the first processor of the electronic control unit being configured to implement:
a client-side communication band setting unit configured to work in conjunction with a service discovery defined in AUTOSAR, and cooperate with a server-side communication band setting unit of the server-side electronic control unit to dynamically set a predetermined communication band required for the data communication on the communication path;

wherein:

the server-side electronic control unit statically holds stream information including a stream identification; and the server-side communication band setting unit is configured to acquire available service information and available event group information from the service discovery in response to transmission of an offered service to the electronic control unit, and to construct and transmit a first message by referring to the stream information.

7. A non-transitory computer-readable storage medium storing a communication band setting program causing an electronic control unit, having a first processor configured as a server of a vehicle data communication system and configured to communicate data with a client-side electronic control unit having a second processor configured as a client via a communication path using a communication protocol for service-oriented communication, wherein the communication band setting program, when executed by the first processor, causes the electronic control unit to:

transmit an offered service from a service discovery defined in AUTOSAR; and cooperate with the client-side electronic control unit to transmit, from a communication band setting unit configured to work with the service discovery, a first message for dynamically setting a predetermined communication band required for data communication on the communication path;

wherein:

the electronic control unit statically holds stream information including a stream identification, and the communication band setting unit is configured to acquire available service information and available event group information from the service discovery in response to transmission of an offered service to the client-side electronic control unit, and to construct and transmit a first message by referring to the stream information.

8. A non-transitory computer-readable storage medium storing a communication band setting program causing an electronic control unit, having a first processor configured as a client of a vehicle data communication system and configured to communicate data with a server-side electronic control unit having a second processor configured as a server via a communication path using a communication protocol for service-oriented communication, wherein the communication band setting program, when executed by the first processor, causes the electronic control unit to:

transmit a subscribe request from a service discovery defined in AUTOSAR; and cooperate with the server-side electronic control unit to transmit, from a communication band setting unit configured to work in conjunction with the service discovery, a second message for dynamically setting a predetermined communication band required for data communication on the communication path;

wherein:

the server-side electronic control unit statically holds stream information including a stream identification, and the communication band setting unit is configured to acquire available service information and available event group information from the service discovery in response to transmission of an offered service to the electronic control unit, and to construct and transmit a first message by referring to the stream information.

* * * * *